(12) United States Patent
de Marco et al.

(10) Patent No.: US 10,615,694 B2
(45) Date of Patent: Apr. 7, 2020

(54) CIRCUIT AND METHOD FOR SUPPRESSING AUDIO NOISE IN DC-DC CONVERTERS

(71) Applicant: Dialog Semiconductor (UK) Limited, London (GB)

(72) Inventors: Louis de Marco, Swindon (GB); Kemal Ozanoglu, Istanbul (TR); Elke Ferner, Graz (AT); Slawomir Malinowski, Graz-Seiersberg (AT)

(73) Assignee: Dialog Semiconductor (UK) Limited, London (GB)

( * ) Notice: Subject to any disclaimer, the term of this patent is extended or adjusted under 35 U.S.C. 154(b) by 2 days.

(21) Appl. No.: 16/124,552

(22) Filed: Sep. 7, 2018

(65) Prior Publication Data

US 2020/0083809 A1 Mar. 12, 2020

(51) Int. Cl.
*H02M 3/158* (2006.01)
*H02M 1/08* (2006.01)

(52) U.S. Cl.
CPC .......... *H02M 3/158* (2013.01); *H02M 1/08* (2013.01); *H02M 3/1582* (2013.01)

(58) Field of Classification Search
CPC ................. H02M 3/157; H02M 3/158; H02M 2001/0035
See application file for complete search history.

(56) References Cited

U.S. PATENT DOCUMENTS

| 3,881,167 A | * | 4/1975 | Pelton | ................ G01V 1/04 |
| | | | | 367/189 |
| 4,929,882 A | * | 5/1990 | Szepesi | ................ H02M 3/156 |
| | | | | 323/222 |
| 5,180,964 A | | 1/1993 | Ewing | |
| RE37,609 E | | 3/2002 | Bittner | |
| 6,452,816 B2 | | 9/2002 | Kuranuki et al. | |
| 6,545,882 B2 | | 4/2003 | Yang | |
| 6,885,176 B2 | | 4/2005 | Librizzi | |

(Continued)

FOREIGN PATENT DOCUMENTS

| CN | 103346663 | 10/2013 |
| CN | 106130344 | 11/2016 |
| DE | 2 323 482 | 11/1974 |

OTHER PUBLICATIONS

PCT International Search Report and Written Opinion, PCT Application No. PCT/US2009/064618, dated Jan. 13, 2010, 8 pages.

(Continued)

*Primary Examiner* — Kyle J Moody
*Assistant Examiner* — Nusrat Quddus
(74) *Attorney, Agent, or Firm* — Saile Ackerman LLC; Stephen B. Ackerman

(57) ABSTRACT

A solution is provided for suppressing audio noise in a DC-DC switching converter. A means for limiting the minimum switching frequency of a pulse-frequency modulation (PFM) control is described. A first order gm amplifier dissipates the excess energy added to the inductor, when magnetizing at faster rate than the native PFM. A higher resistance, low-side scaled switch helps reduce wasted energy losses. The low-side scaled switch reduces the rise in the inductor current during magnetization, and hence keeps efficiency up at low loads, when the PFM minimum switching frequency is active.

27 Claims, 8 Drawing Sheets

(56) References Cited

U.S. PATENT DOCUMENTS

| | | | |
|---|---|---|---|
| 7,030,596 B1 * | 4/2006 | Salerno | H02M 3/158 323/282 |
| 7,098,641 B2 | 8/2006 | King | |
| 7,102,339 B1 | 9/2006 | Ferguson | |
| 7,368,897 B2 | 5/2008 | Qahouq et al. | |
| 7,403,400 B2 | 7/2008 | Stanley | |
| 7,804,282 B2 | 9/2010 | Bertele | |
| 8,018,212 B1 | 9/2011 | Petricek | |
| 8,018,743 B2 | 9/2011 | Wang et al. | |
| 8,049,481 B2 | 11/2011 | Li et al. | |
| 9,287,776 B2 * | 3/2016 | Mei | H02M 3/1563 |
| 2001/0035745 A1 | 11/2001 | Muratov et al. | |
| 2006/0273772 A1 | 12/2006 | Groom | |
| 2008/0030178 A1 * | 2/2008 | Leonard | H02M 3/156 323/282 |
| 2008/0175029 A1 * | 7/2008 | Jung | H02M 3/156 363/79 |
| 2009/0015230 A1 | 1/2009 | Alessandro et al. | |
| 2009/0309561 A1 | 12/2009 | Chen et al. | |
| 2011/0267018 A1 | 11/2011 | Tao | |
| 2012/0250360 A1 * | 10/2012 | Orr | H02M 3/3376 363/21.02 |
| 2013/0335051 A1 | 12/2013 | Le-Hung et al. | |
| 2015/0002116 A1 | 1/2015 | Bernon-Enjalbert et al. | |
| 2015/0062108 A1 * | 3/2015 | Archibald | H02M 3/156 345/212 |
| 2016/0105110 A1 | 4/2016 | Houston et al. | |
| 2016/0190925 A1 * | 6/2016 | Tan | H02M 3/158 323/271 |
| 2016/0294277 A1 | 10/2016 | Romeo | |
| 2016/0352228 A1 | 12/2016 | Zhang | |
| 2016/0352231 A1 * | 12/2016 | Quigley | H02M 3/33507 |
| 2017/0133941 A1 * | 5/2017 | Huang | H02M 3/33523 |
| 2018/0191199 A1 * | 7/2018 | Kim | H03B 27/00 |
| 2018/0375429 A1 * | 12/2018 | Trichy | H02M 1/15 |

OTHER PUBLICATIONS

PCT International Search Report and Written Opinion, PCT Application No. PCT/US2010/023219, dated Apr. 12, 2010, 7 pages.

"Buck-Boost Converter Controlled by Hysteretic PWM Method with Input Voltage Feedforward," by Tomonori Watanabe et al., 2011 IEEE 33rd International Telecommunications Energy Conference (INTELEC), Oct. 9-13, 2011, 6 pages.

German Office Action, File No. 10 2017 212 349.4, Applicant: Dialog Semiconductor (UK) Limited, dated Mar. 13, 2018, 9 pages and English language translation, 7 pages.

Co-pending U.S. Appl. No. 15/475,537, filed Mar. 31, 2017, "Hysteretic Buck-Boost Converter," by Kemal Ozanoglu et al. ,42 pages.

* cited by examiner

CIRCUIT AND METHOD FOR SUPPRESSING AUDIO NOISE IN DC-DC CONVERTERS

RELATED PATENT APPLICATION

This application is related to U.S. patent application Ser. No. 16/124,563, filed on, Sep. 7, 2018, which is owned by a common assignee, and is herein incorporated by reference in its entirety.

BACKGROUND

Field

The present disclosure relates generally to a DC-DC switching converter, and more specifically to a Boost converter with audio noise suppression.

Background

Light load operations in prior art DC-DC switching converters is usually performed with some kind of hysteretic control, such as PFM (Pulse-Frequency Modulation) or PSM (Pulse-Skip Mode). The reason is that in light load operations switching losses are dominant, so a constant switching frequency control such as PWM (Pulse-Width Modulation), where the loop needed to determine the length required to magnetize the inductor within a switching period is usually inefficient. Furthermore, the loop needed to perform PWM control is usually power hungry, increasing the IQ of the system. PWM control is usually not preferred at light loads, and hysteretic control is used instead, where for a given condition, the inductor is magnetized for a determined amount of time, and the control decides how long NOT to magnetize the inductor, effectively changing the switching frequency of the system. This type of control is very efficient at light load, where losses due to switching activity are saved, reducing the IQ, or quiescent current, which is the current drawn by the switching converter in a no-load and non-switching but enabled condition. This type of control has the disadvantage of allowing any switching frequency.

What is needed is a solution for switching activity falling in the range of audio noise. In addition, a solution is needed that provides a low IQ and high efficiency at light loads.

SUMMARY

Accordingly, it is an object of one or more embodiments of the present disclosure to provide a method for suppressing audio noise in a DC-DC switching converter, supporting the option to limit the minimum switching frequency, for example keeping the switching activity greater than 20 kHz at all times.

It is a further object of one or more embodiments of the disclosure to limit the minimum switching frequency when a converter is operating in hysteretic control.

Still further, it is an object of one or more embodiments of the disclosure to minimize the efficiency loss, so that implementing a hysteretic control at light loads brings efficiency improvements compared to normal PWM operation.

Other objects will appear hereinafter.

The above and other objects of the present disclosure may be accomplished in the following manner. A circuit for suppressing audio noise, in a DC-DC switching converter, is disclosed, comprising a first order gm amplifier, configured to sink excessive current the output of the switching converter, and to receive a programmable over voltage threshold on its inverting input and a switching converter output feedback voltage on its non-inverting input. The circuit further comprises a low side device, connected between a node voltage and ground, and a low side scaled device, connected between a node voltage and ground. The circuit further comprises hysteretic, Burst control logic, configured to generate bursts of constant TON pulses for controlling the low side device at the appropriate frequency to regulate the output voltage for a given set of conditions (Vin, L, C, Iout), and to generate narrow dummy pulses for controlling the low side scaled device at a minimum switching frequency.

The above and other objects of the present disclosure may be further accomplished by a method for suppressing audio noise, in a DC-DC switching converter. The steps include detecting when the DC-DC switching converter is not switching, within a defined time-window. The steps also include utilizing dummy pulses to insure a minimum switching frequency higher than a predefined value, where the dummy pulses activate a scaled pass device. The steps also include dissipating excess energy, added as a result of the dummy pulses, through a first order gm amplifier.

In various embodiments the function may be achieved with any kind of PFM control.

In various embodiments the function may be achieved for any frequency level.

In various embodiments the function may be achieved with any type of DC-DC switching converter.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

The present disclosure offers a practical way to limit the minimum switching frequency, when a switching converter is operating in hysteretic control. Efficiency loss is minimized, so that implementing a hysteretic control at light load brings efficiency improvement compared to normal PWM operation. Although the present disclosure provides a method for suppressing audio noise in a Boost converter, the proposed solution can be directly applied to any converter type, at any frequency level.

Figure 1A:
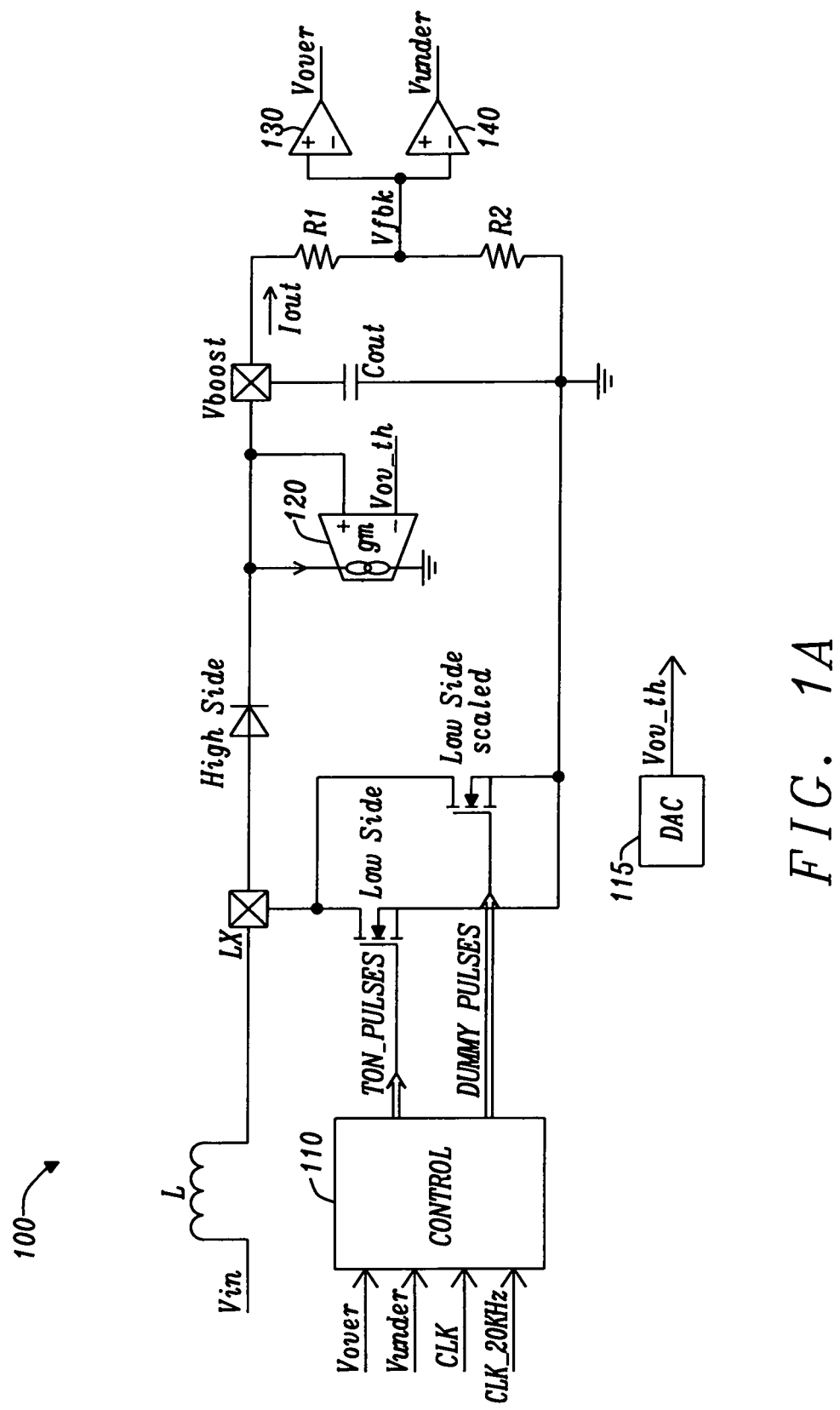
FIG. 1A illustrates a Boost switching converter of the present disclosure, implementing a hysteretic, Burst control.

FIG. 1A illustrates 100, a Boost switching converter of the present disclosure, implementing a hysteretic, Burst control. The Boost converter includes Low Side, Low Side scaled, and High Side devices. Output capacitor Cout is connected at output voltage Vboost, and inductor L is connected between input voltage Vin and node voltage LX. First order gm amplifier 120 receives voltage threshold Vov_th, where Vov_th is the output of a digital to analog converter (DAC) 115 on its inverting input, and output Vboost on its non-inverting input. In this embodiment, the gm amplifier has a power supply across Vboost and ground. Gm amplifier 120 is a transconductance amplifier, such as an operational transconductance amplifier (OTA). Output feedback voltage Vfbk is across voltage divider R1/R2, and drives comparators 130 and 140 at non-inverting and inverting inputs, respectively. The gm amplifier functions as a load current dump cell, where the OTA is able to provide a current Iout=gm(Vplus−Vminus). This gm amplifier is designed to provide only sinking capability, and if Vboost>Vov_th, as a result of the additional current magnetized with dummy pulses, the OTA will sink current Iout=gm(Vboost−Vov_th). It is effectively a control loop that regulates Vboost to Vov_th by sinking the excessive current the coil is charged with when limiting the switching frequency.

Figure 1B:
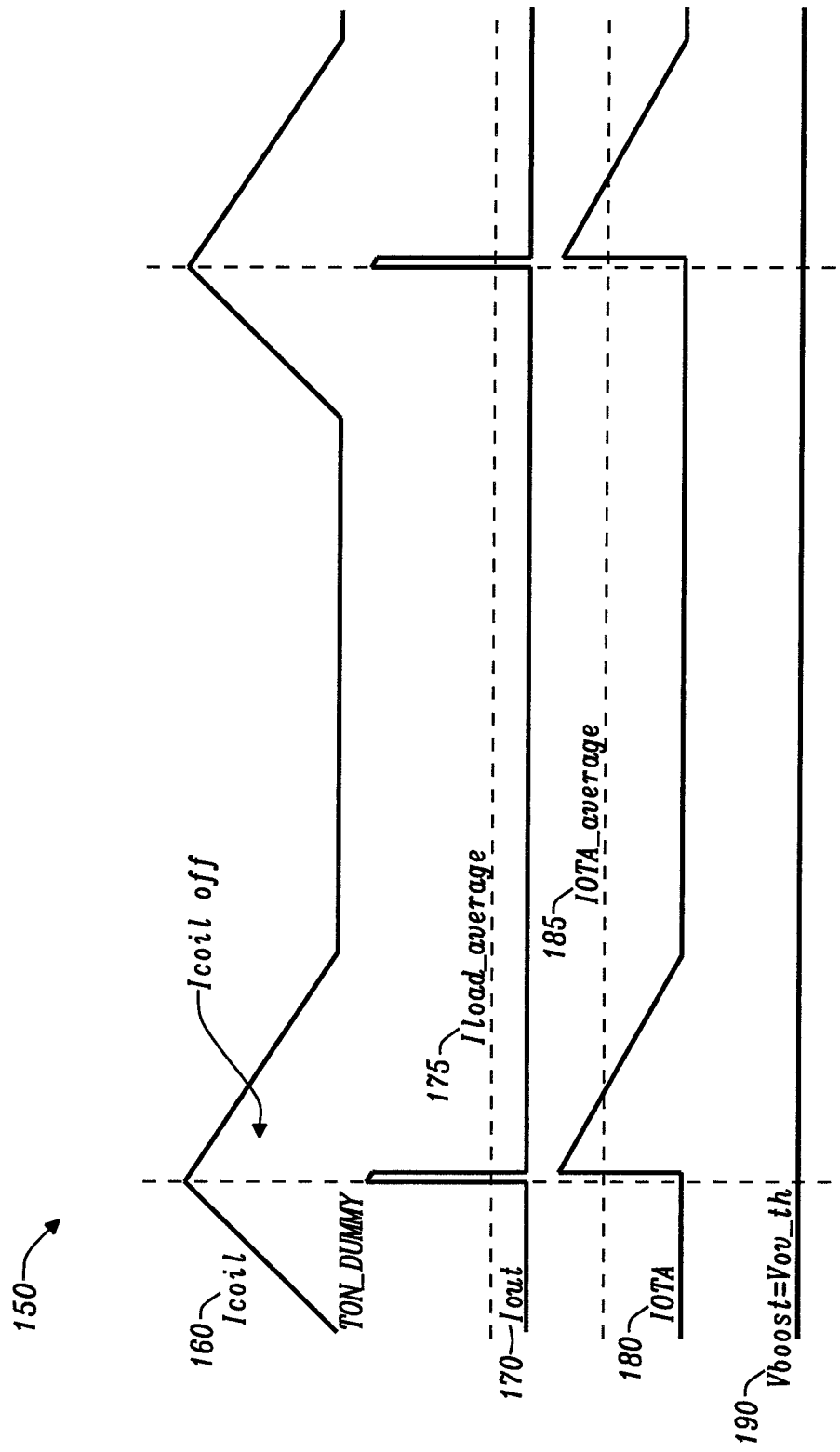
FIG. 1B illustrates waveforms to illustrate the gm amplifier operation of FIG. 1A

FIG. 1B illustrates 150, waveforms to illustrate the gm amplifier operation of FIG. 1A. If for a given condition the PFM natural frequency is below the minimum frequency and unnecessary switching events are added through dummy pulses, Vboost is regulated to Vov_th. This is because part of current Icoil 160 through coil L will go to the output to compensate any Iout 170, that might take charge away from Cout, and the remaining current in the coil will be sunk by the gm amplifier in IOTA 180. On average, Icoil_off_average=Iload_average(175)+IOTA_average (185) and Icout=0, and Vboost is regulated to a DC value of Vov_th 190, for the High Side device of FIG. 1A, connected between node LX and output Vboost.

Low Side and Low Side scaled devices may be NMOS type devices, where the scaling for the Low Side scaled device is a design choice and a small size is preferred. The reason to use a scaled version of the Low Side device is to save on switching losses, because the gate capacitance is smaller, and the switching losses result in increased IQ. Since the goal is to add some switching activity, but to minimize the increase in IQ, this implies a small device is needed for switching. The Low Side device has its drain at node LX and the drain of the Low Side scaled device, and its source at ground and the source of the Low Side scaled device.

Over voltage 130 and under voltage 140 comparators determine voltages Vover and Vunder, respectively. Signals Vover and Vunder, CLK, and chosen frequency CLK_20 kHz, are input to hysteretic, Burst CONTROL 110. Signals TON_PULSES and DUMMY_PULSES are outputs from CONTROL 110, and drive the gates of Low Side and Low Side scaled devices, respectively.

Figure 2:
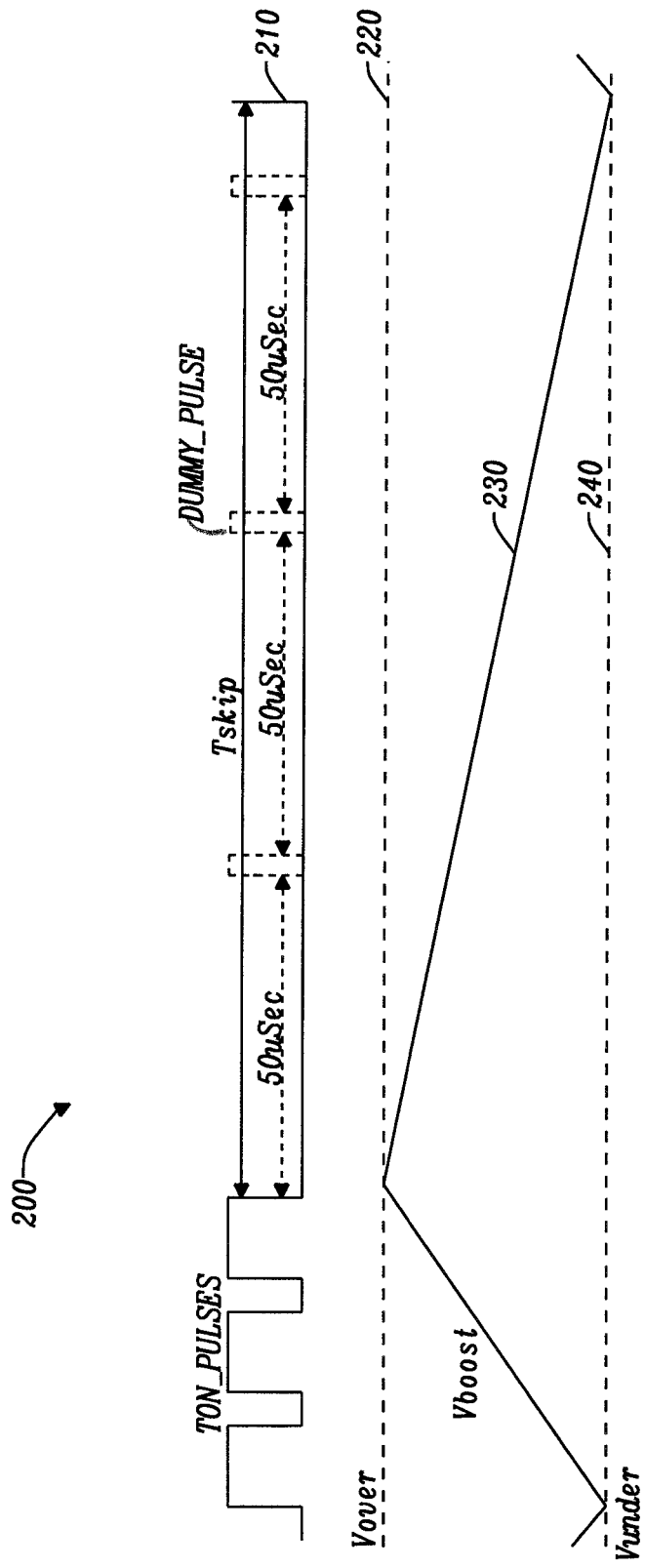
FIG. 2 shows when the output of the switching converter hits a threshold, a burst of pulses is sent.

Control 110 is a state machine that counts how long Low Side device is OFF in FIG. 2. This can be implemented in many ways, and one way is illustrated in the related patent application, U.S. patent application Ser. No. 16/124,565. The Natural PFM generates a burst of TON_PULSES and Tskip at any switching frequency. These are generated by means of a CLK in the hysteretic control. The control detects Tskip, and adds narrow dummy pulses to drive the Low Side scaled device, using CLK_20 kHz.

FIG. 2 shows 200, when the output of the switching converter Vboost 230 hits the under voltage threshold Vunder 240, a Burst of TON_PULSES 210 is sent. The clock determines the period for TON_PULSES. CLK_20 kHz is chosen to 20 kHz and generates the additional DUMMY_PULSES, where CLK is the main clock of the natural PFM and generates the burst of TON_PULSES. The TON_PULSES magnetize and de-magnetize inductor L, until output Vboost hits the over voltage threshold Vover 220, at which time the switching activity stops. It is clear that for a given condition of input Vin, output Vboost, inductor L, and capacitor Cout, that the lower the output current, the longer the Tskip time will last, and the shorter the burst of TON_PULSES.

A key observation is that the hysteretic Burst control changes Tskip with the given conditions, and this applies to any kind of PFM control. The system will therefore switch at any frequency, and the system can switch as low as required, including the audio noise range. Switching events are added to make sure the minimum switching frequency is higher than a predefined value. In the example of FIGS. 1B & 2, a frequency of 20 kHz (50 uSec) is chosen, but the concept of the present disclosure applies to any switching frequency to limit the system.

If the hysteretic Burst control detects that no switching activity has occurred in the 50 uSec time window, DUMMY_PULSES are generated to magnetize the inductor, and the system will be forced to switch every 50 uSec, for a frequency of 20 kHz. As this would be unwanted energy, the output will start increasing. A first order loop, which includes the gm amplifier, will sink the excessive current, regulating the output voltage around a programmable voltage threshold Vov_th, preventing the output from drifting. Therefore the gm amplifier automatically adapts the necessary additional load to the external conditions of input Vin, output Vboost, inductor L, and capacitor Cout, which differs from techniques in which a bleed resistor or artificial load are employed. Notice that with the system of the present disclosure, Vboost will lose the characteristic sawtooth shape of hysteretic control shown in FIG. 2. Vboost will look more like a DC voltage regulated around a threshold, with negligible ripple. This observation is particularly important for systems where the frequency of the ripple voltage is a concern in audio noise.

The hysteretic Burst control of the present disclosure is not limited to this particular implementation, but applies to any kind of PFM control, where the period of switching activity is changed with switching conditions and load current. Also note that the disclosure is not limited to Boost converters, and can be applied to any type of switching converter, such as Buck converters and Buck-Boost converters.

Figure 3:
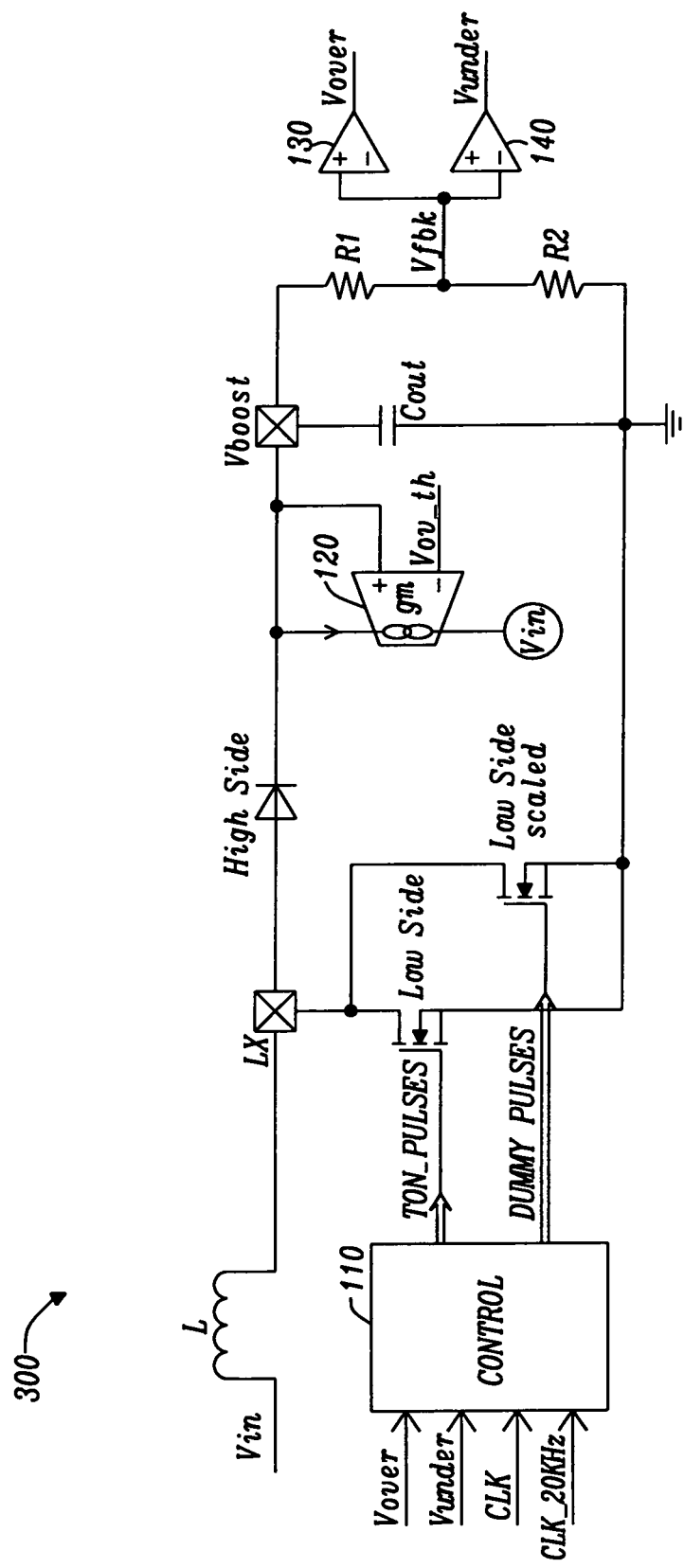
FIG. 3 illustrates a second embodiment of the disclosure, recirculating the excessive energy back into Vin, while minimizing the switching activity.

FIG. 3 illustrates 300, a second embodiment of the disclosure, in which excessive current is circulated back into Vin, while minimizing the switching activity. DUMMY_PULSES, from Control 110, need to be as narrow as possible, and just long enough to be longer than the combined propagation delay of the logic, the level shifters, and the drivers of the circuit. When the action of forcing the converter to switch more often than necessary results in increased current from input Vin, the DUMMY_PULSES turn on a scaled version of the pass device, Low Side scaled, to help minimize switching activity. This applies to the embodiment of FIG. 1A as well. The difference between FIG. 1A and FIG. 3 embodiments is that in FIG. 1A, the excessive energy is lost to ground, while in FIG. 3 recovering the excessive energy is achieved by feeding it back to Vin via the gm amplifier. Then, additional current during the OFF time of DUMMY_PULSES magnetization is recovered by connecting the power supply for the gm amplifier across Vboost and Vin, in this second embodiment. For example, when there is enough Vboost-Vin voltage margin for the gm amplifier to work properly, the excessive current generated by the DUMMY_PULSES can be recovered by recirculating it back to VIN. The higher resistance, Low-side scaled device helps to reduce wasted energy, by limiting the rise in inductor current during magnetization and limiting the switching loss associated with turning on the large Low Side device, hence limiting the excessive energy needed to limit the switching frequency.

Figure 4A:
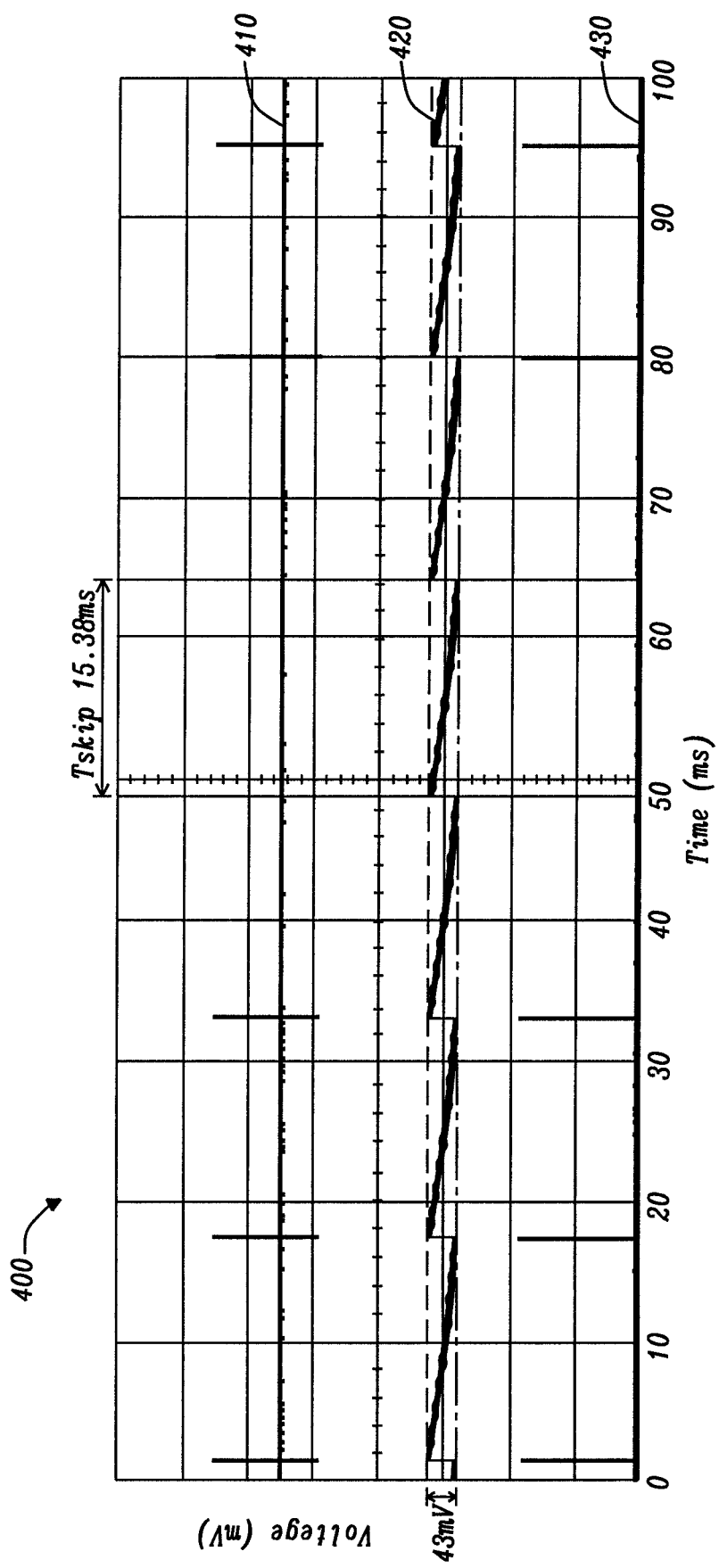
FIG. 4A shows waveforms for the Boost converter of FIG. 1 working on silicon with no load, and the 20 kHz limitation of the disclosure disabled.

FIG. 4A shows 400, waveforms for the Boost converter of FIG. 1A working on silicon with no load, and the 20 kHz limitation of the disclosure disabled. With this particular condition, the system is switching current in the inductor approximately every Tskip=15.38 mSec, or about 65 Hz. This can be seen in both waveform 410, for node voltage LX, and waveform 430, showing the current pulsed in inductor L. Output voltage Vboost 420 has the typical triangular shape with a ripple of 43 mV, at the same frequency.

Figure 4B:
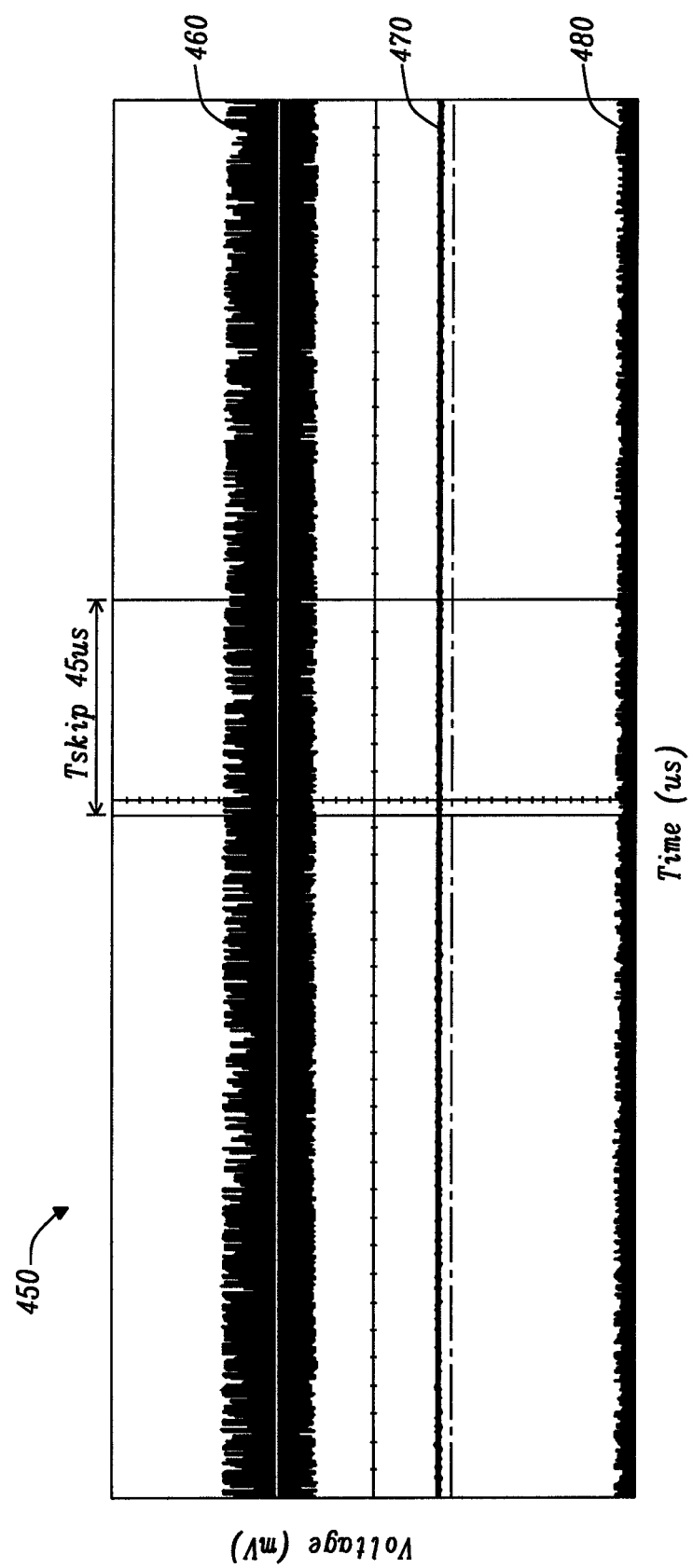
FIG. 4B shows waveforms for the Boost converter of FIG. 1 working on silicon, when the audio noise suppression feature is enabled.

FIG. 4B shows 450, waveforms for the Boost converter of FIG. 1A working on silicon with no load, and the 20 kHz limitation of the disclosure enabled. The switching activity is much more than what was seen in FIG. 4A. This is illustrated in waveform 460, for node voltage LX, and waveform 480, showing the current pulsed in inductor L. With the audio noise suppression feature enabled, output voltage Vboost 470 looks more like a DC voltage with no discernible ripple.

Figure 5:
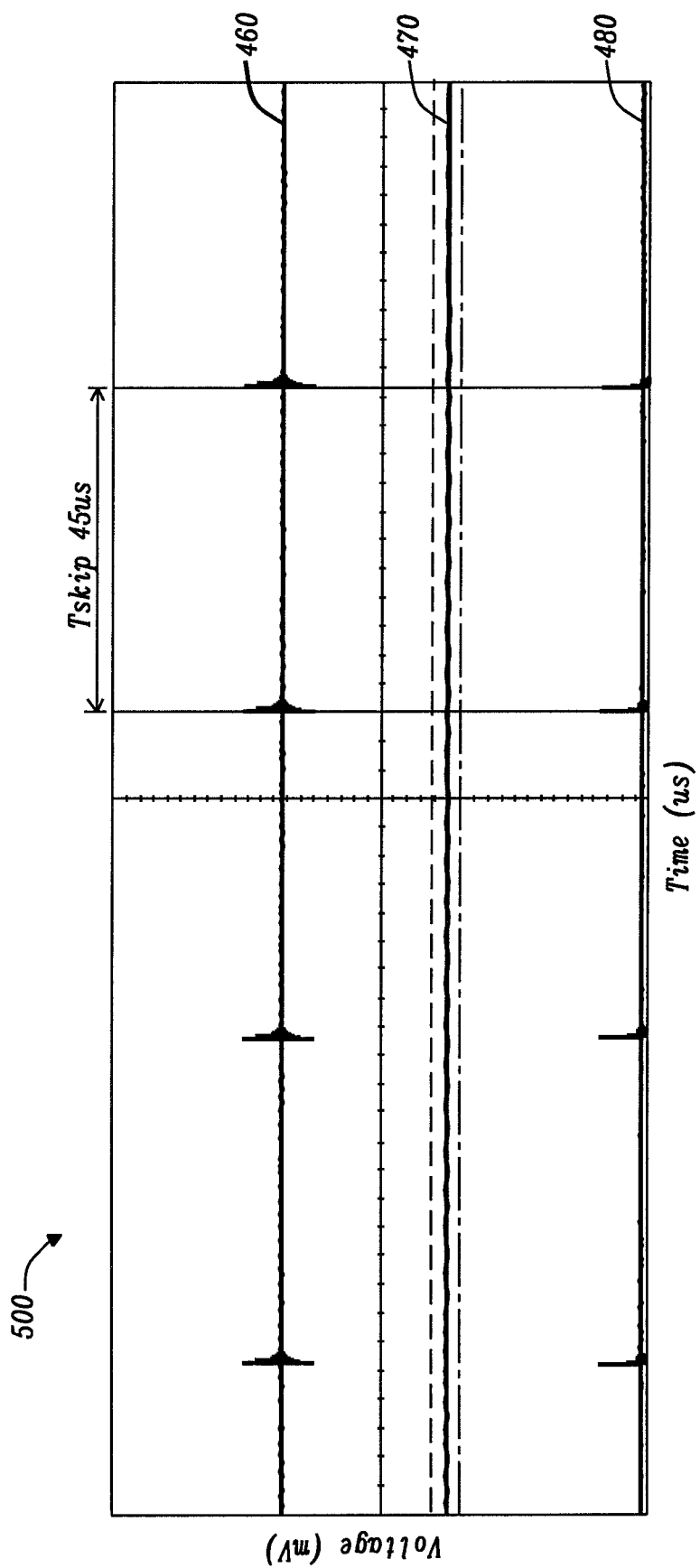
FIG. 5 illustrate waveforms for a Boost converter working on silicon with no load, and the limitation of the disclosure enabled, and the details of FIG. 4B magnified.

FIG. 5 illustrates 500, waveforms for a Boost converter working on silicon with no load, the 20 kHz limitation of the disclosure enabled, and the details of FIG. 4B magnified. Here the audio noise suppression adds switching events every 45 uSec, and is configurable between 45 uSec and 55 uSec, for a maximum Tskip limiting the minimum switching frequency to about 22 kHz. Typical additional current requested from input voltage Vin, to limit the switching frequency, is in the order of tens of uA. This is illustrated in waveform 460, for node voltage LX, and waveform 480, showing the current pulsed in inductor L. Enabling the disclosure causes output voltage Vboost 470 to look flat, when compared to Vboost 420 in FIG. 4A, where ripple is seen on the output.

Figure 6:
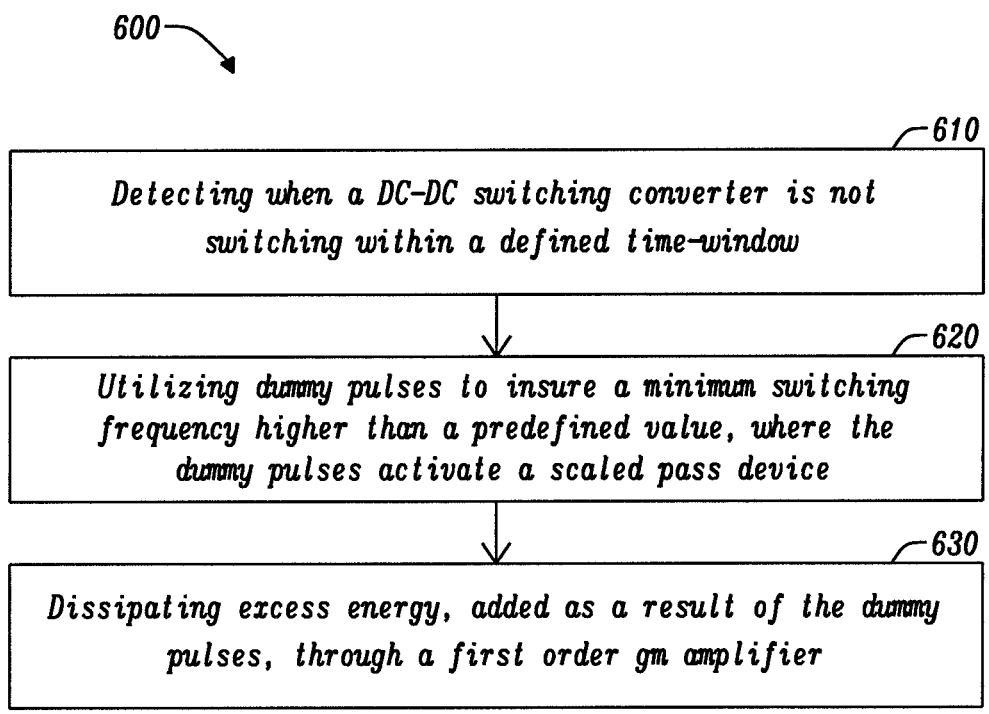
FIG. 6 is a flow chart of a method for suppressing audio noise, in a DC-DC switching converter.

FIG. 6 is flow chart 600 of a method for suppressing audio noise in a DC-DC switching converter. The steps include 610, detecting when the DC-DC switching converter is not switching, within a defined time-window. The steps also include 620, utilizing dummy pulses to insure a minimum switching frequency higher than a predefined value, where the dummy pulses activate a scaled pass device. The steps also include 630, dissipating excess energy, added as a result of the dummy pulses, through a first order gm amplifier.

The main advantage of one or more embodiments of the present disclosure include is to reduce or eliminate noise generated by a switching converter at audio or other frequencies. An additional advantage includes limiting the frequency of a ripple on the output voltage of the switching converter.

While particular embodiments of the present disclosure have been illustrated and described, it will be understood by those skilled in the art that various changes in form and details may be made without departing from the spirit and scope of the invention.

The invention claimed is:

1. An audio noise suppression circuit, in a DC-DC switching converter, comprising:
a first order gm amplifier, configured to sink excessive current from an output of the converter, and to receive a programmable voltage threshold on its inverting input and a switching converter output feedback voltage on its non-inverting input;
a low side device, connected between a node voltage and ground;
a low side scaled device, connected between the node voltage and ground; and
hysteretic Burst control logic, configured to generate bursts of on pulses to drive the low side device in a pulse-frequency mode (PFM),
and dummy pulses to drive a gate of the low side scaled device, for controlling the low side scaled device at a minimum switching frequency.

2. The circuit of claim 1, wherein a clock determines a period for said on pulses.

3. The circuit of claim 1, wherein said first order gm amplifier is configured to regulate said output feedback voltage.

4. The circuit of claim 1, wherein said first order gm amplifier has a power supply across said output feedback voltage and ground.

5. The circuit of claim 1, wherein said first order gm amplifier has a power supply across said output feedback voltage and said input voltage.

6. The circuit of claim 1, further comprising a voltage divider connected between said output feedback voltage and ground, configured to provide a feedback voltage.

7. The circuit of claim 6, further comprising an over voltage comparator configured to receive said feedback voltage on a non-inverting input.

8. The circuit of claim 6, further comprising an under voltage comparator configured to receive said feedback voltage on an inverting input.

9. The circuit of claim 1, wherein said low side device has its source connected to a source of said low side scaled device, and its drain to the node voltage.

10. The circuit of claim 1, wherein said on pulses drive a gate of said low side device.

11. The circuit of claim 1, further comprising an output capacitor connected at said output feedback voltage.

12. The circuit of claim 1, further comprising an inductor connected between said input voltage and said node voltage.

13. The circuit of claim 1, wherein said low side device and said low side scaled devices are NMOS type devices.

14. The circuit of claim 1, wherein the DC-DC switching converter has a period of switching activity configured to change with switching conditions and load current.

15. The circuit of claim 1, wherein the DC-DC switching converter is configured for a switching frequency of 20 kHz or higher.

16. The circuit of claim 1, wherein the DC-DC switching converter is a Boost switching converter.

17. The circuit of claim 1, wherein the DC-DC switching converter is a Buck-Boost or Buck switching converter.

18. The circuit of claim 1, wherein said first order gm amplifier is an operational transconductance amplifier (OTA).

19. The circuit of claim 1, wherein said dummy pulses have a frequency of 20 kHz or higher.

20. A method for suppressing audio noise, in a DC-DC switching converter, comprising:
- detecting when said DC-DC switching converter is not switching, within a defined time-window;
- utilizing dummy pulses to insure a minimum switching frequency higher than a predefined value, wherein said dummy pulses drive a gate of a scaled pass device; and
- dissipating excess energy, added as a result of said dummy pulses, through a first order gm amplifier.

21. The method of claim 20, wherein said first order gm amplifier sinks current from an output of said DC-DC switching converter.

22. The method of claim 20, further comprising operating a low side pass device in pulse-frequency modulation (PFM).

23. The method of claim 20, wherein said DC-DC switching converter uses hysteretic control.

24. The method of claim 20, wherein said dummy pulses are longer than a propagation delay of logic plus level shifters plus drivers.

25. The method of claim 20, further comprising regulating an output voltage, using said first order gm amplifier, around a programmable overvoltage threshold.

26. The method of claim 20, wherein said minimum switching frequency is above an audio range.

27. The method of claim 20, wherein said minimum switching frequency is above 20 kHz.

* * * * *